(12) United States Patent
Murphy

(10) Patent No.: US 8,538,819 B2
(45) Date of Patent: Sep. 17, 2013

(54) METHOD AND SYSTEM FOR DYNAMIC FUNDING

(75) Inventor: Timothy M. Murphy, San Mateo, CA (US)

(73) Assignee: eBay Inc., San Jose, CA (US)

( * ) Notice: Subject to any disclaimer, the term of this patent is extended or adjusted under 35 U.S.C. 154(b) by 1453 days.

(21) Appl. No.: 11/881,920

(22) Filed: Jul. 30, 2007

(65) Prior Publication Data

US 2009/0037285 A1 Feb. 5, 2009

(51) Int. Cl.
*G06Q 20/00* (2012.01)
*G06Q 40/00* (2012.01)

(52) U.S. Cl.
USPC ............................................... 705/16; 705/44

(58) Field of Classification Search
None
See application file for complete search history.

(56) References Cited

U.S. PATENT DOCUMENTS

| | | | |
|---|---|---|---|
| 2002/0181710 A1* | 12/2002 | Adam et al. | 380/270 |
| 2004/0267663 A1 | 12/2004 | Karns et al. | |
| 2006/0163345 A1 | 7/2006 | Myers et al. | |
| 2007/0001001 A1 | 1/2007 | Myers et al. | |
| 2007/0055630 A1 | 3/2007 | Gauthier et al. | |

FOREIGN PATENT DOCUMENTS

WO WO-2009017754 A1 2/2009

OTHER PUBLICATIONS

International Application Serial No. PCT/US2008/009200, International Search Report Mailed on Nov. 5, 2008, 5 pgs.
International Application Serial No. PCT/US2008/009200, International Written Opinion Mailed on Nov. 5, 2008, 7 pgs.
"Barcode—Wikpedia description", *Wikpedia*; http://en.wikipedia.org/wiki/Bar_code, (Accessed Jul. 5, 2007), 12 pgs.
"Barcode Tyvek Wristbands", http://www.americanwristbands.com/barcode.htm, (Accessed Jul. 5, 2007), 1 pg.
"Directory Kiosk Software Overview", http://www.kingpoducts.com/products/kiosksoftware/directory/, (Accessed Jul. 6, 2007),2 pgs.
"Hold the Phone: Visa's Mobile Strategy Offiers New Ways to Pay, More Rewards and Services", *Visa USA*; http://usa.visa.com/about_visa/press_resources/news/press_releases/nr355.html (Nov. 15, 2006),2 pgs.
"Mediastick to launch bar-code-based retailing for cell phones", www.accessmylibrary.com; http://goliath.ecnext.com/coms2/summary_0199-420024_ITM, (Jun. 7, 2004),1 pg.
"New Bar Codes Can Talk With Your Cell Phone", *Digital Journal open media source*; www.digitaljournal.com/article/155460/New_Bar_Codes_Can_Talk_With_Your_Cell, (Accessed Jul. 5, 2007),2 pgs.
"Prior Art Database", IP.com; http://www.priorartdatabase.com/IPCOM/000139258/, (Accessed Jul. 5, 2007),2 pgs.

(Continued)

*Primary Examiner* — Paul Danneman
(74) *Attorney, Agent, or Firm* — Schwegman Lundberg & Woessner, P.A.

(57) ABSTRACT

An identifier of a mobile device may be accessed. The identifier may be associated with a payment account. A single use authentication code relating to the identifier may be generated. The single use authentication code may be capable of being used to authenticate the mobile device at a point of sale (POS) device and enable a funds adjustment to the payment account. The single use authentication code may be provided to the mobile device through a communications network.

43 Claims, 15 Drawing Sheets

(56) References Cited

OTHER PUBLICATIONS

"SMS Barcode, Text Codes, Text Barcodes to Cell Phones, SMS, Bulk MMS, Premium . . . ", http://www.smsbarcodes.co.za/main.html, (Accessed Jul. 5, 2007),2 pgs.

"SMS Case Studies: Bulk SMS, Corporate SMS, SMS Marketing, Web to SMS", http://www.smsbarcodes.co.za/sms_case_studies.html, (Accessed Jul. 5, 2007),4 pgs.

"Subscriber Identity Module (SIM card)", *Wikpedia*; http://en.wikpedia.org/wiki/Sim_card, (Accessed Jul. 10, 2007),4 pgs.

"The Use of Barcodes in Mobile Marketing, Advertising, CRM", http://www.adazonusa.com/theuseofbarcodesmsinmobilemarketingadvertisingcrm-a-3.html, (Accessed Jul. 6, 2007),2 pgs.

"Will that be cash or cell pt 2", *The Pondering Primate*, http://theponderingprimate.blogspot.com/2005/04/will-that-be-cash-or-cell-pt-2.html, (Apr. 28, 2005),10 pgs.

"Wireless payment with your cell phone are around the corner", http://blogs.znet.com/Berlind/?p=302, (Jan. 11, 2007),7 pgs.

Barthold, Jim , "Visa Tries Couponing Without Scissors", http://www.telecommagazine.com/newsglobe/article.asp?HH_ID=AR_2574, (Nov. 15, 2006),2 pgs.

\* cited by examiner

METHOD AND SYSTEM FOR DYNAMIC FUNDING

BACKGROUND

A payment card (e.g., a credit card) may be used to authenticate payment from a payment account. A cryptographic key may be included in a magnetic stripe of the payment card and used at a point of sale to identify whether the card is a legitimate card. The information in the magnetic stripe may be subject to unauthorized capture, thereby compromising both the payment account and the card. A nefarious user that has made that unauthorized capture may be able to withdraw funds from the payment account using the card one or more times before the unauthorized activity is detected.

BRIEF DESCRIPTION OF THE DRAWINGS

Some embodiments are illustrated by way of example and not limitation in the figures of the accompanying drawings in which.

DETAILED DESCRIPTION

Example methods and systems for dynamic funding authentication are described. In the following description, for purposes of explanation, numerous specific details are set forth in order to provide a thorough understanding of example embodiments. It will be evident, however, to one skilled in the art that the present invention may be practiced without these specific details.

In an example embodiment, an identifier of a mobile device may be accessed. The identifier may be associated with a payment account. A single use authentication code relating to the identifier may be generated. The single use authentication code may be capable of being used to authenticate the mobile device at a point of sale (POS) device and enable a funds adjustment to the payment account. The single use authentication code may be provided to the mobile device through a communications network.

In an example embodiment, an identifier of a first mobile device of a first user may be accessed. The identifier of the first mobile device may be associated with a payment account of the first user. A single use authentication code relating to the identifier of the first mobile device may be generated. The single use authentication code may be capable of being used to authenticate a second mobile device of a second user at a POS device and enable a funds adjustment to the payment account of the first user. The single use authentication code may be provided to the second mobile device through a communications network.

In an example embodiment, funding authorization may be requested from an authentication provider through a mobile device. A single use authentication code may be received from the authentication provider. The single use authentication code may be capable of being used to authenticate the mobile device at a POS device and enable a funds adjustment to the payment account. The single use authentication code may be provided through the mobile device.

In an example embodiment, a single use authentication code may be received from a mobile device. The single use authentication code and a funding request may be provided over a payment network to an authentication provider. Funds adjustment related to the funding request may be received from the authentication provider.

Figure 1:
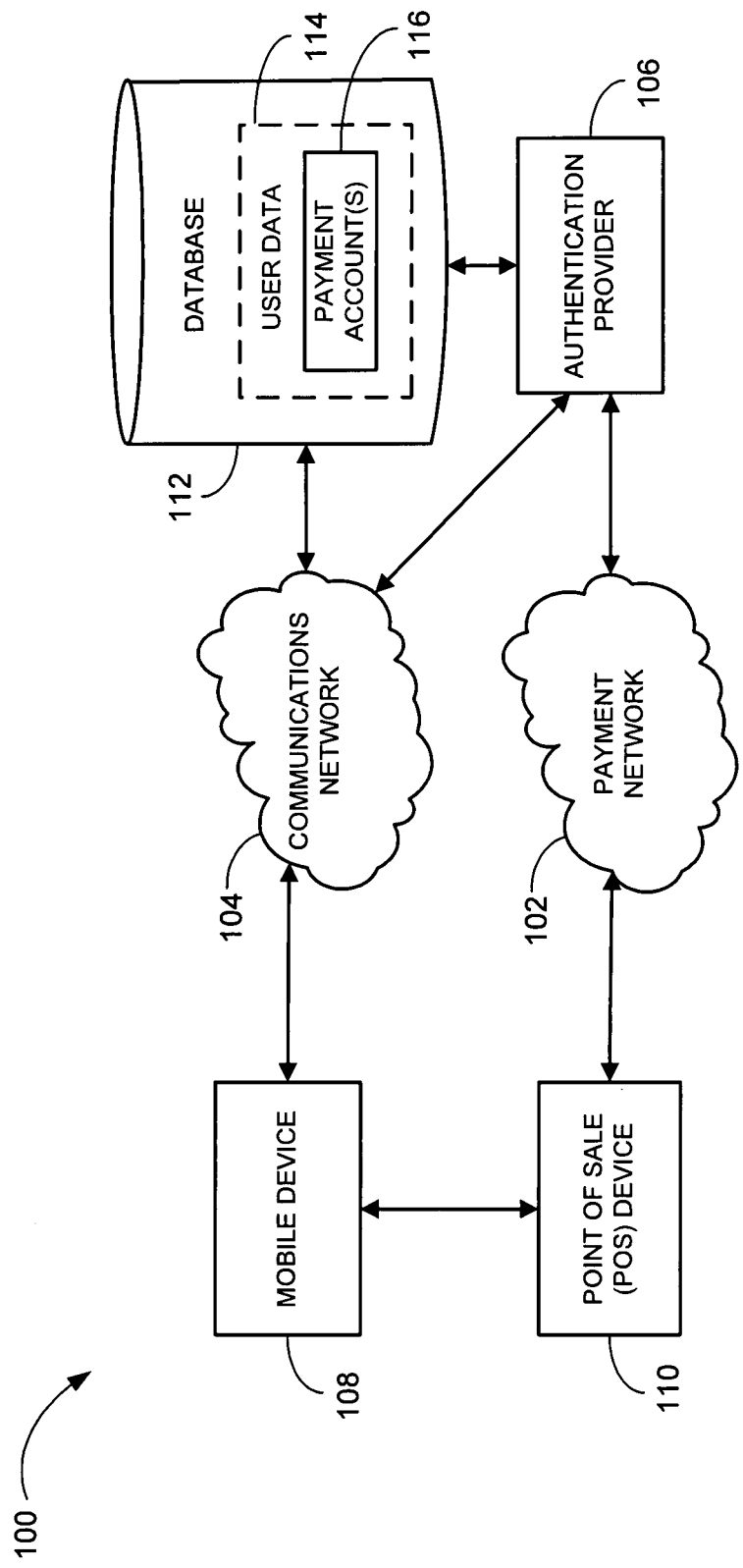
FIG. 1 is a block diagram of a system, according to an example embodiment.

FIG. 1 illustrates an example system 100 in which an authentication provider 106 may communicate with a mobile device 108 through a communications network 104 and a POS device 110 through a payment network 102. The system 100 may enable a user of the mobile device 108 to be dynamically authenticated for payment with the authentication provider 106 using the mobile device 108 at the POS device 110.

The payment network 102 may be a network used by a credit card company, a debit card company, a bank, or other institution for authorization of financial or other transactions. The payment network 102 may be deployed over the Internet, intranet, and/or other type of local or global network.

The communications network 104 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used. In an example embodiment, the payment network 102 and the communications network 104 may be the same network.

The mobile device 108 may be a mobile phone, a personal digital assistant (PDA), a gaming unit, a portable computing unit, and the like. A user may use the mobile device 108 to obtain dynamic authentication for purchasing one or more items in a location (e.g., a store) in which the POS device 110 is located. The user may request that the dynamic authentication be made, or the dynamic authentication may occur automatically when a user is in proximity to the POS device 110

The authentication provider 106 may retain an identifier (e.g. a SIM card number) associated with the mobile device 108 in memory and/or stored in the user data 114 of the database 112. The identifier may enable a payment account 116 of a user to be linked to the mobile device 108 of the user or another authorized user (e.g., a child or spouse of the user associated with the payment account 116). Each user of the authentication provider 106 may have a separate payment account 116.

Figure 2:
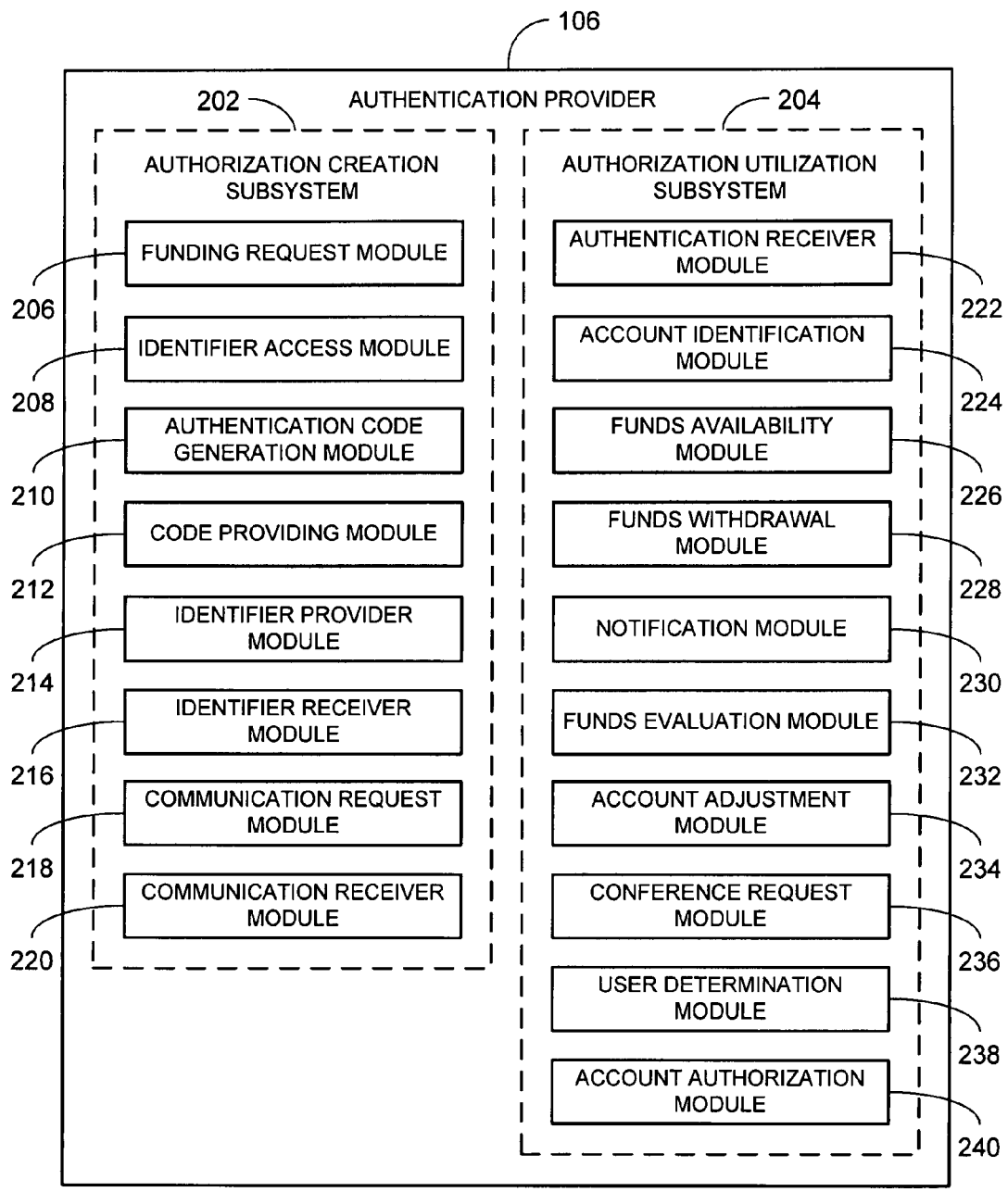
FIG. 2 is a block diagram of an example authentication provider that may be deployed within the system of FIG. 1 according to an example embodiment.

FIG. 2 is an example of an authentication provider 106 that may be deployed in the system 100 (see FIG. 1) or another system according to an example embodiment. The authentication provider 106 may include an authorization creation subsystem 202, an authorization utilization subsystem 204, and/or another subsystem.

The authorization creation subsystem 202 may include a funding request module 206, an identifier access module 208, an authentication code generation module 210, a code providing module 212, an identifier provider module 214, an identifier receiver module 216, a communication request module 218, and/or a communication receiver module 220. Other modules may also be used.

The funding request module 206 receives a request for funding authorization from the mobile device 108. The request for funding authorization may be received when the mobile device 108 is in proximity to the POS device 110 and a user is seeking dynamic authentication.

The identifier access module 208 accesses the identifier of the mobile device 108. The identifier access module 208 may associate the payment account 116 with the identifier of the mobile device 108 and/or the identifier of the mobile device 108 may already be associated with the payment account 116 of a user. The association links the payment account 116 to the mobile device 108.

The authentication code generation module 210 generates a single use authentication code relating to the identifier. The single use authentication code may be capable of being used to authenticate the mobile device 108 at the POS device 110 and enable a funds adjustment to the payment account 116 of a user.

The code providing module 212 provides the single use authentication code and an optional access code to the mobile device 108 through the communications network 104. The access code may be capable of being used by a user at a terminal of the POS device 110 to authorize the funds adjustment.

The identifier provider module 214 sends an identifier request for the identifier to the mobile device provider (e.g., AT&T Knowledge Ventures or Sprint Nextel) and/or the mobile device 108. The identifier receiver module 216 receives the identifier of the mobile device 108 from the mobile device provider and/or the mobile device 108. The received identifier may be stored in the user data 114.

The communication request module 218 sends a communication request message to the mobile device 108 including a request for a request for a confirmation code. The communication receiver module 220 receives the confirmation code from the mobile device 108. The receipt of the confirmation code may confirm that the user is in possession of the mobile device 108.

The authorization utilization subsystem 204 may include an authentication receiver module 222, an account identification module 224, a funds availability module 226, a funds withdrawal module 228, a notification module 230, a funds evaluation module 232, an account adjustment module 234, a conference request module 236, a user determination module 238, and/or an account authorization module 240. Other modules may also be used.

The authentication receiver module 222 receives a funds adjustment request and the single use authentication code from the POS device 110 through the payment network 102. The account identification module 224 identifies the payment account 116 associated with the identifier related to the single use authentication code.

The funds availability module 226 determines availability of funds in the payment account 116 of a user for an amount indicated in the funds adjustment request. The funds withdrawal module 228 withdraws funds in the amount from the payment account of the user.

The notification module 230 sends a notification. The notification may be, by way of example, a notification that the funds in a particular amount have been withdrawn from the payment account 116 of a user, a notification that the payment account 116 has been adjusted by the amount, a notification identifying a merchant that has been provided the amount, or a notification identifying one or more items have been purchased with the amount. Other notifications may also be used.

The funds evaluation module 232 evaluates the funds adjustment request against an evaluation criterion. The account adjustment module 234 adjusts the payment account 116 of a user by the amount. The conference request module 236 sends a confirmation request to the mobile device 108 and receives a response to the confirmation request.

The user determination module 238 determines whether a first user associated with the payment account 116 has authorized adjustment by an amount indicated in the funds adjustment request for a second user associated with the mobile device 108. The account authorization module 240 receives account authorization for a second user from a first user.

Figure 3:
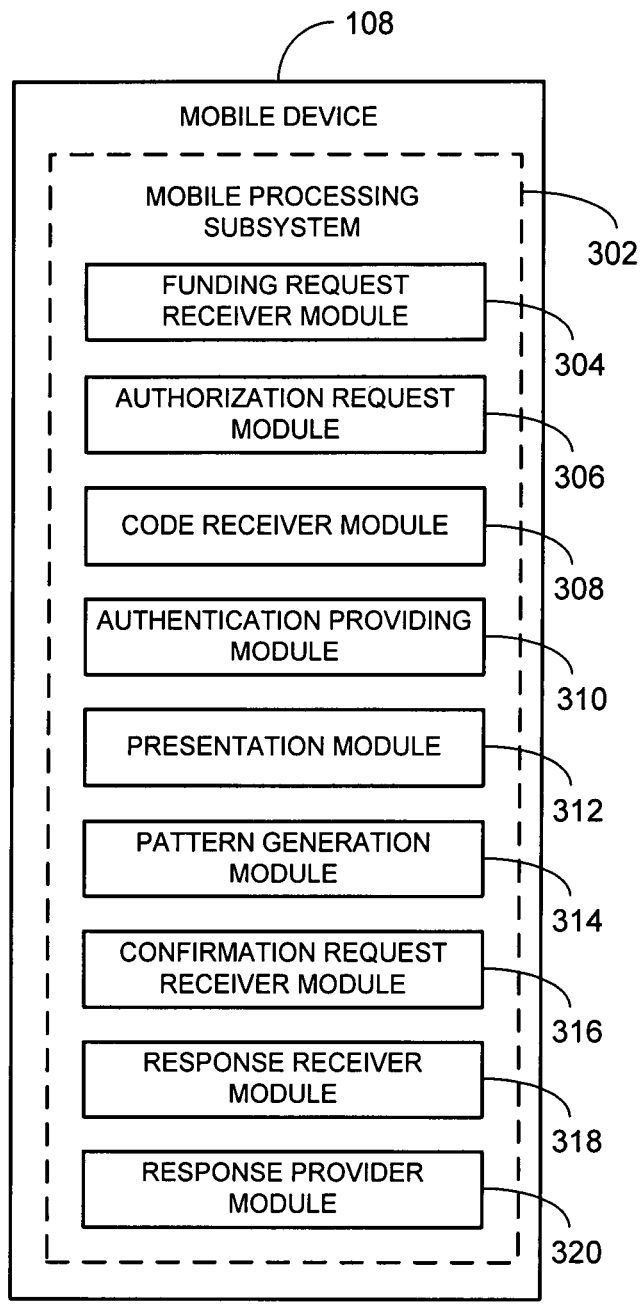
FIG. 3 is a block diagram of an example mobile device that may be deployed within the system of FIG. 1 according to an example embodiment.

FIG. 3 is an example of a mobile device 108 that may be deployed in the system 100 (see FIG. 1) or another system according to an example embodiment. The mobile device 108 may include a mobile processing subsystem 302 and/or another subsystem.

The mobile processing subsystem 302 may include a funding request receiver module 304, an authorization request module 306, a code receiver module 308, an authentication providing module 310, a presentation module 312, a pattern generation module 314, a confirmation request receiver module 316, a response receiver module 318, and/or a response provider module 320. Other modules may also be used.

The funding request receiver module 304 receives a funding request from a user of the mobile device 108. The authorization request module 306 requests funding authorization from the authentication provider 106 through the mobile device 108.

The code receiver module 308 receives a single use authentication code and an optional access code from the authentication provider 106. The single use authentication code may be capable of being used to authenticate the mobile device 108 at the POS device 110 and enable a funds adjustment to the payment account 116. The access code may be capable of being used with a terminal of the POS device 110 to authorize the funds adjustment.

The authentication providing module 310 provides the single use authentication code and an optional authorization routing number through the mobile device 108. The authorization routing number may be capable of being used to identify the authentication provider 106 associated with the payment account 116. For example, the authorization routing number may be used to select the payment network 102 from a number of available payment networks from a number of authentication providers.

The presentation module 312 presents the access code, the single use authentication code, a single use pattern, a confirmation request, and/or the authorization routing number on a display of the mobile device 108.

The pattern generation module 314 generates a single use pattern (e.g., a bar code) from the single use authentication code and the authorization routing number. The single use pattern may be capable of being scanned by the POS device 110.

The confirmation request receiver module 316 receives a confirmation request from the authentication provider 106. The response receiver module 318 receives a response to the confirmation request. The response provider module 320 provides the response to the authentication provider 106.

Figure 4:
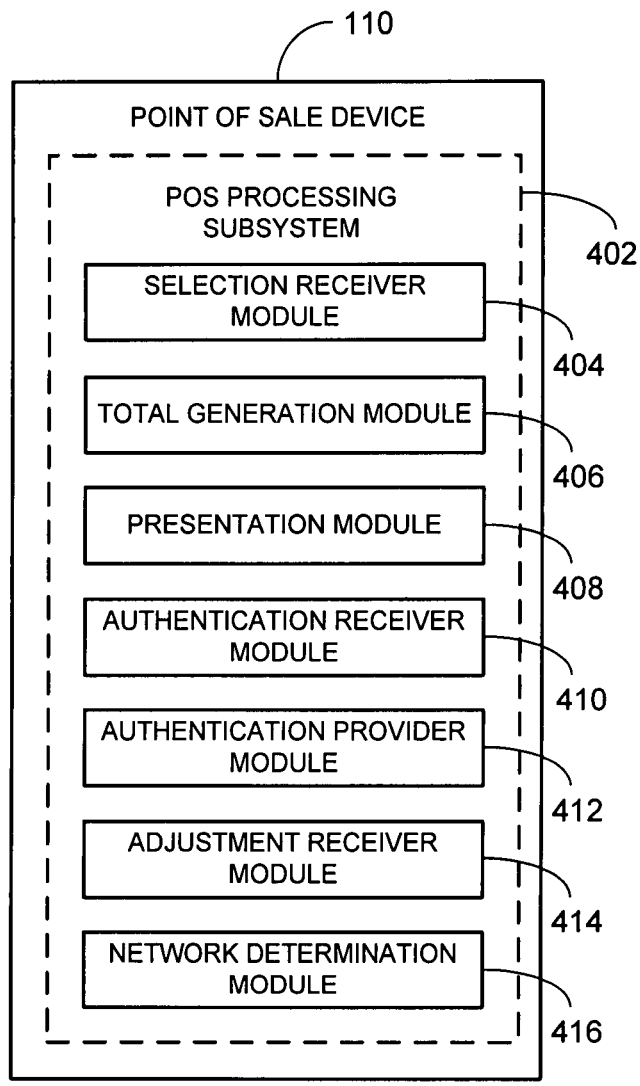
FIG. 4 is a block diagram of an example point of sale device that may be deployed within the system of FIG. 1 according to an example embodiment.

FIG. 4 is an example of a POS device 110 that may be deployed in the system 100 (see FIG. 1) or another system according to an example embodiment. The POS device 110 may include a POS processing subsystem 402 and/or another subsystem.

The POS processing subsystem 402 may include a selection receiver module 404, a total generation module 406, a presentation module 408, an authentication receiver module 410, an authentication provider module 412, an adjustment receiver module 414, and/or a network determination module 416. Other modules may also be used.

The selection receiver module 404 receives a selection of one or more items (e.g., for purchase). The total generation module 406 generates a total for the selection. The presentation module 408 presents the total for the selection on a display of the POS device 110.

The authentication receiver module 410 receives a single use authentication code and an optional authorization routing number from the mobile device 108. The authentication provider module 412 provides the single use authentication code and a funding request over the payment network 102 to the authentication provider 106.

The adjustment receiver module 414 receives funds adjustment related to the funding request from the authentication provider 106. The network determination module 416 determines the payment network 102 from among a number of available payment networks based on the authorization routing number.

Figure 5:
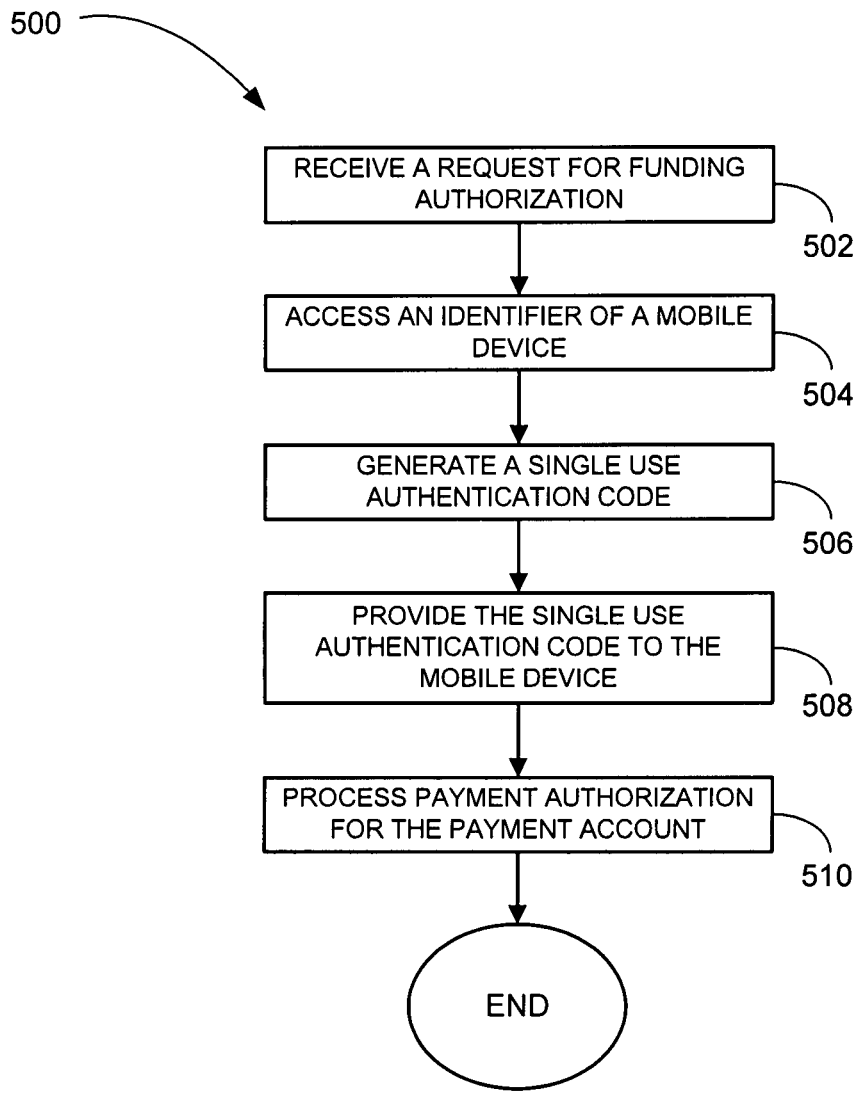
FIG. 5 is a flowchart illustrating a method for funding authentication according to an example embodiment.

FIG. 5 illustrates a method 500 for funding authentication according to an example embodiment. The method 500 may be performed by the authentication provider 106 (see FIG. 1) or another provider.

A request for funding authorization may be received from the mobile device 108 at block 502. The request may be sent from the mobile device 108 through the communications network 104. The request may be sent via a text message, an e-mail, a SMS message, or the like.

An identifier of the mobile device 108 is accessed at block 504. The identifier may be unique or substantially unique (e.g., to distinguish the mobile device 108 of one user from other users). The identifier may be associated with the payment account 116 of a user. The identifier may be stored on a Subscriber Identity Module (SIM) card of the mobile device 108, a Removable User Identity Module (RUIM) of the mobile device 108, and/or known by a mobile device provider. The payment account 116 may be associated with the identifier of the mobile device 108 during the operations of block 504 or prior to initiating the operations of block 504.

In an example embodiment, the association of the payment account 116 with the identifier may include, by way of example, sending an identifier request for the identifier to a mobile device provider and receiving the identifier of the mobile device 108 from the mobile device provider, sending an identifier request for the identifier to the mobile device 108 and receiving the identifier of the mobile device 108 from the mobile device 108, or the like.

A single use authentication code relating to the identifier is generated at block 506. The single use authentication code may be capable of being used to authenticate the mobile device 108 at the POS device 110 and enable a funds adjustment to the payment account 116. The single use authentication code may include, by way of example, a single use universal product code (UPC), a single use debit card number, a single use credit card number, a single use account reference number, or the like. Providing a single use authentication code to the mobile device 108 may enable a user of the mobile device to have a two-factor authentication at the POS device 110. The single use authentication code may enable a dynamically generated code to be used to provide greater security for the payment account 116 and to reduce a potential for fraud with the payment account 116.

The single use authentication code and an optional access code is provided to the mobile device 108 through the communications network 104 at block 508. The access code may be capable of being used with a terminal of the POS device 110 to authorize the funds adjustment.

Payment authorization for the payment account 116 may be processed at block 510. An example embodiment of the payment authorization is described in greater detail below.

Figure 6:
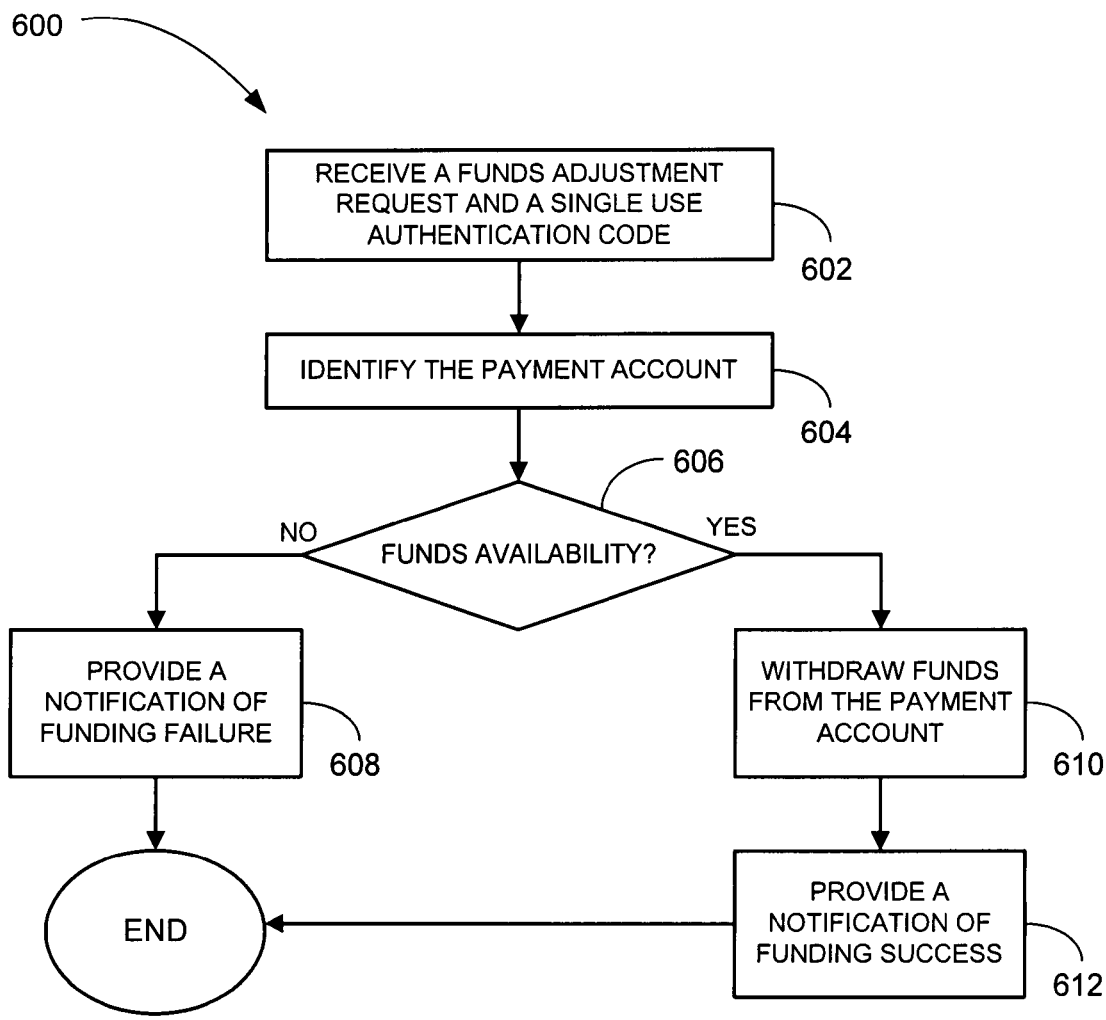
FIGS. 6-8 are flowcharts illustrating a method for processing payment authorization for the payment account according to an example embodiment.

FIG. 6 illustrates a method 600 for processing payment authorization for the payment account 116 according to an example embodiment. The method 600 may be performed at block 510 (see FIG. 5) by the authentication provider 106 or otherwise performed.

A funds adjustment request and the single use authentication code is received from the POS device 110 through the payment network 102 at block 602. The payment account 116 is identified from the identifier related to the single use authentication code at block 604.

A determination may be made at decision block 606 as to the availability of funds in the payment account 116 for an amount indicated in the funds adjustment request. If a determination is made that funds are not available in the payment account 116, a notice of funding failure may be provided at block 608. If a determination is made at decision block 606 that funds are available in the payment account 116, funds are withdrawn in the amount from the payment account 116 at block 610 and a notice of funding success may be provided at block 612.

In an example embodiment, the notification of funding success may include, for example, a notification that the funds in the amount have been withdrawn from the payment account 116, a notification identifying a merchant that has been provided the amount, or a notification identifying one or more items that have been purchased with the amount. Other notifications may also be used.

Figure 7:
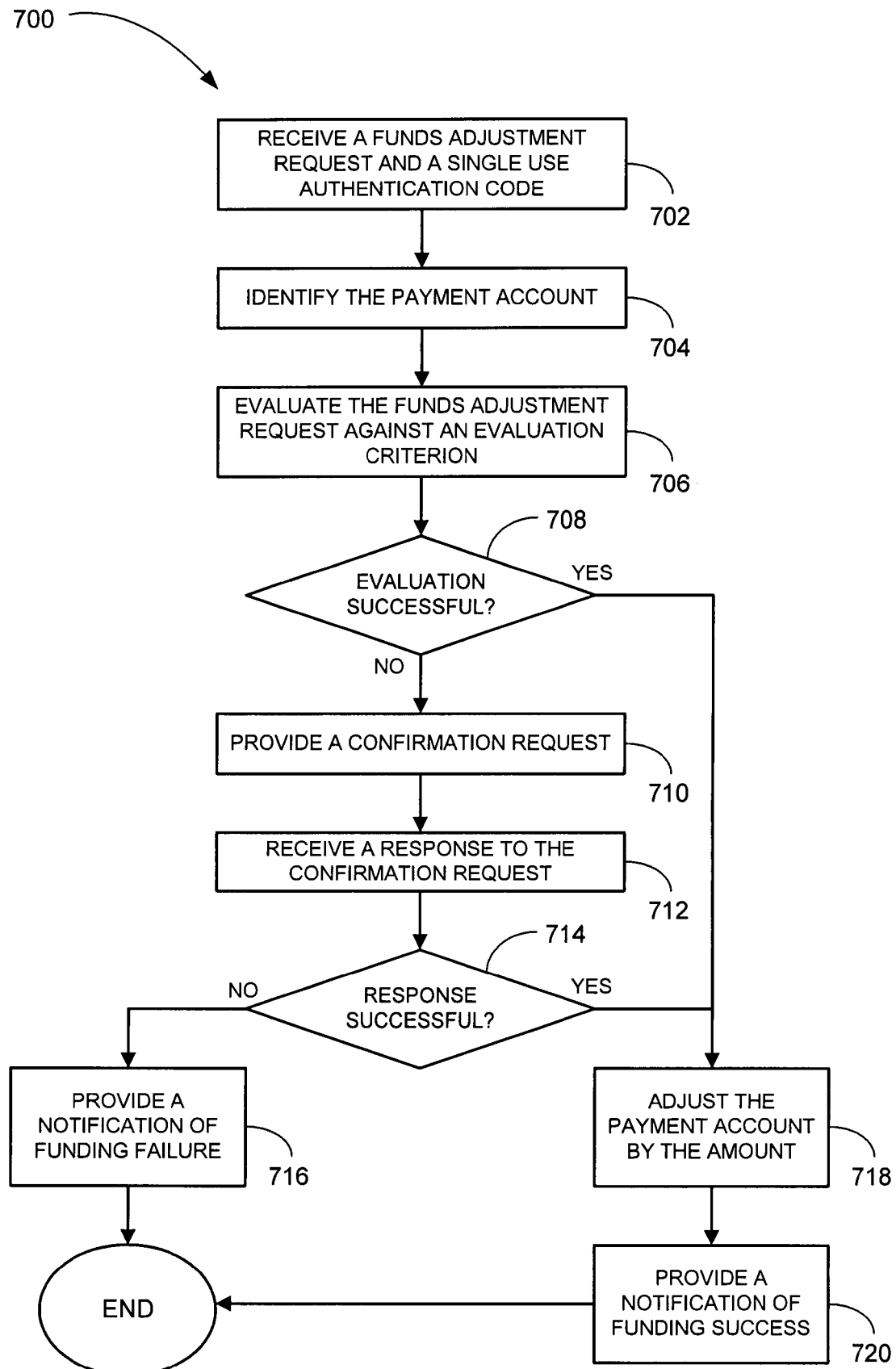

FIG. 7 illustrates a method 700 for processing payment authorization for the payment account 116 according to an example embodiment. The method 700 may be performed at block 510 (see FIG. 5) by the authentication provider 106 or otherwise performed.

At block 702, a funds adjustment request and the single use authentication code is received from the POS device 110 through the payment network 102. The payment account 116 is identified from the identifier related to the single use authentication code at block 704.

An evaluation of the funds adjustment request against an evaluation criterion is made at block 706. The evaluation criterion may include a limit on a period of time since a pin code (e.g. for access to the mobile device 108) was entered into the mobile device 108, a calling pattern made with the mobile device 108, a transaction pattern made with the payment account 116, a period of time between when the single use authentication code was generated and provided to the mobile device 108 and received back from the POS device 110, a specified sum of money, a specified type of item, and/or a specified merchant. Other criterion may also be used.

A determination may be made at decision block 708 as to whether the evaluation was successful. If a determination is made that the evaluation was successful, the method 700 may proceed to block 718. If a determination is made at decision block 708 that the evaluation is not successful, the method 700 may proceed to block 710.

At block 710, a confirmation request may be sent. The confirmation request may be sent to the mobile device 108, provided orally to a user of the mobile device 108, or otherwise provided. The confirmation request may include a request for a pin code to be received by the mobile device 108, a request for an audible confirmation to be received by the mobile device 108, and/or a request for a log in to a web site provided by the authentication provider 106. Other confirmation requests may also be used. A response to the confirmation request may be received at block 712. For example, the confirmation request may be provided through the mobile device 108 or to an agent speaking with the user of the mobile device 108.

A determination may be made at decision block 714 as to whether the response was successful. If a determination is made that the response was not successful, a notice of funding failure may be provided at block 716. If a determination is made at decision block 714 that the response was successful, the payment account 116 is adjusted by the amount at block 718 and a notice of funding success may be provided at block 720. For example, adjusting the payment account 116 may include adding or subtracting funds (e.g., money or other stored value) from the payment account 116.

Figure 8:
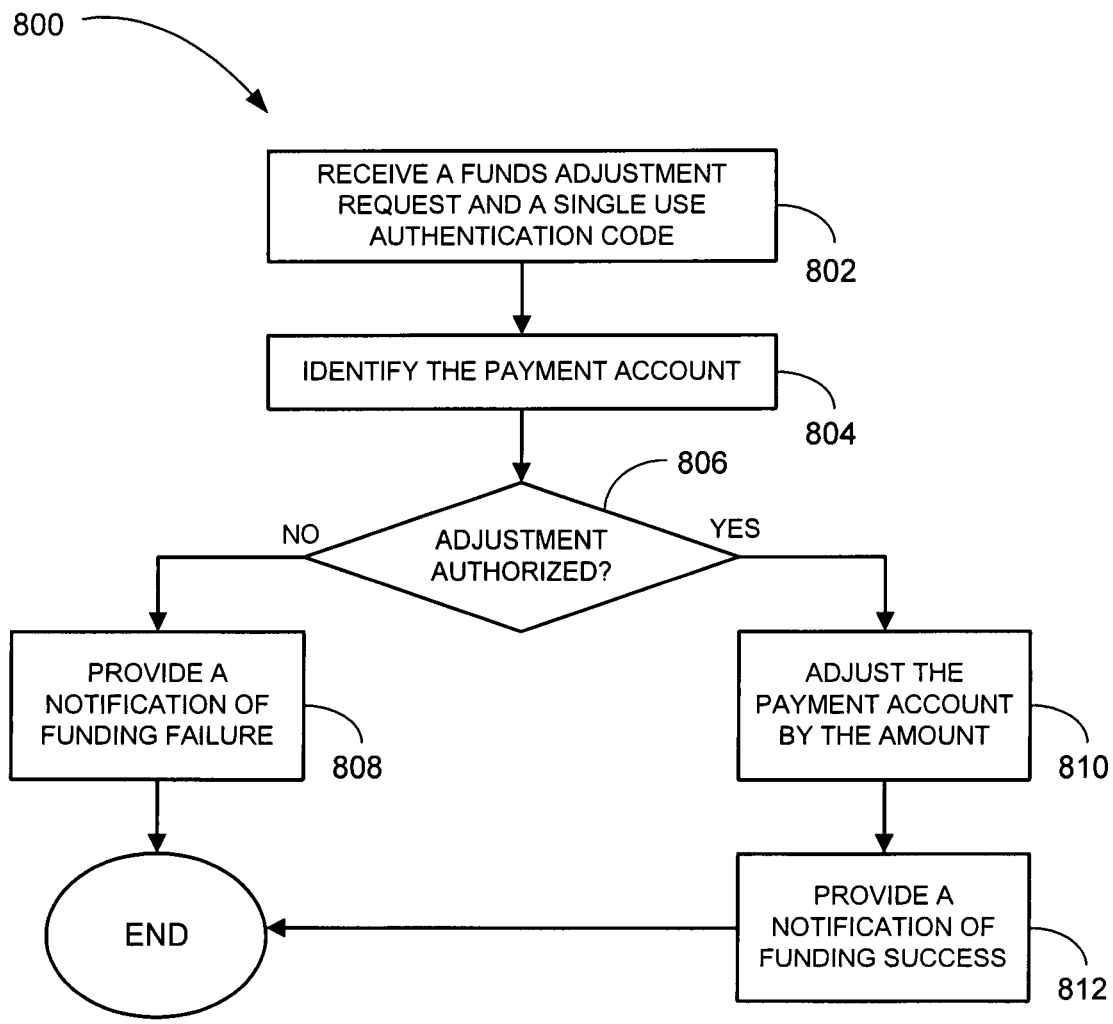

FIG. 8 illustrates a method 800 for processing payment authorization for the payment account 116 according to an example embodiment. The method 800 may be performed at block 510 (see FIG. 5) by the authentication provider 106 or otherwise performed.

At block 802, a funds adjustment request and the single use authentication code is received from the POS device 110 through the payment network 102. The payment account 116 is identified from the identifier related to the single use authentication code at block 804.

A determination may be made at decision block 806 as to whether a first user (e.g., a parent0 associated with the payment account 116 has authorized adjustment by an amount indicated in the funds adjustment request for a second user (e.g., a child) associated with the mobile device 108. If a determination is made that the payment account has not been authorized, a notice of funding failure may be provided at block 808. If a determination is made at decision block 806 that the payment account 116 has been authorized, the payment account 116 is adjusted by the amount at block 810 and a notification of funding success may be provided at block 812.

Figure 9:
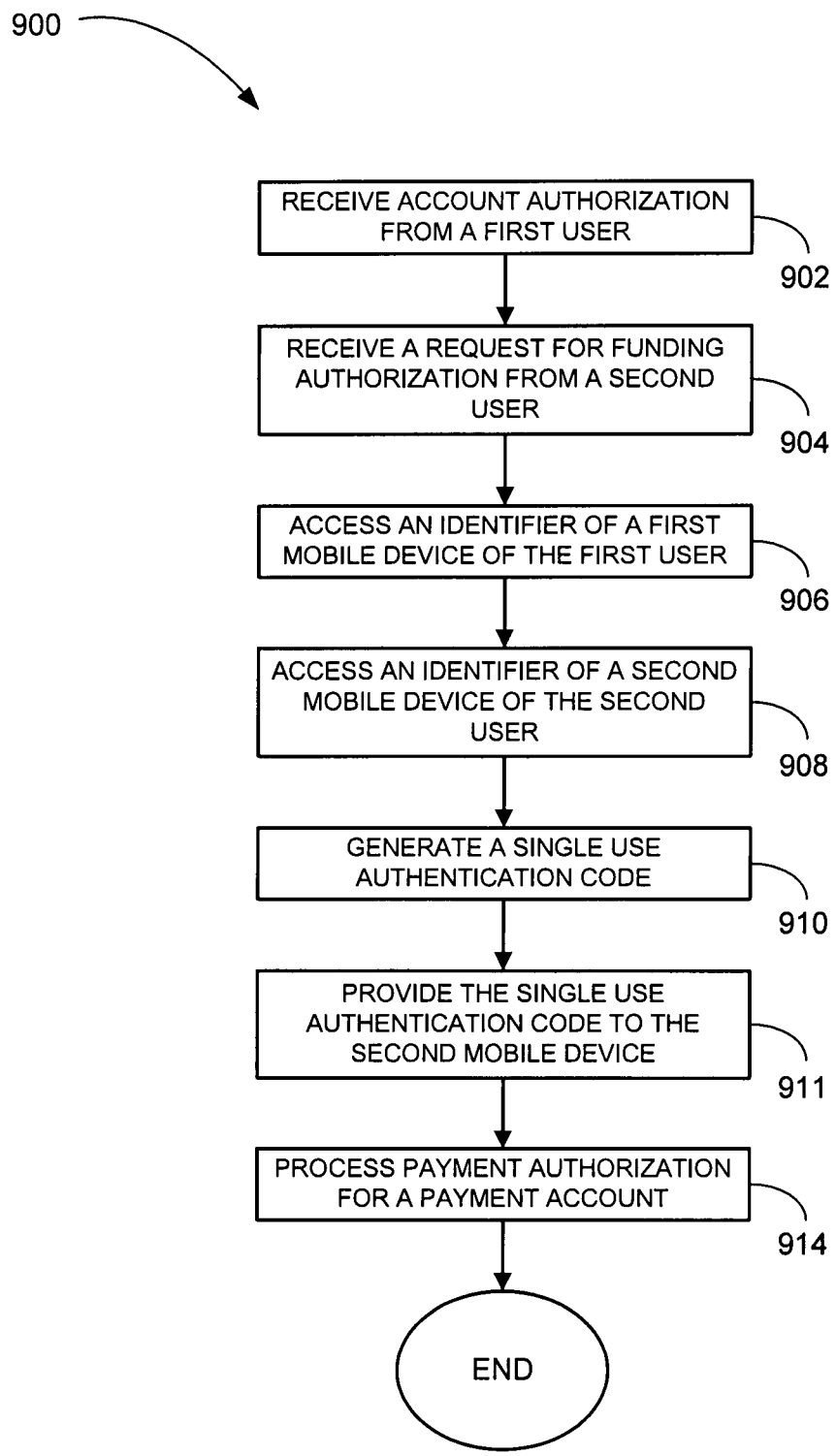
FIG. 9 is a flowchart illustrating a method for funding authentication according to an example embodiment.

FIG. 9 illustrates a method 900 for funding authentication according to an example embodiment. The method 900 may be performed by the authentication provider 106 (see FIG. 1) or another provider.

Account authorization for a second user may be received from a first user at block 902. For example, a parent may provide account authorization for a child, a user may provide account authorization for a spouse, and the like. A request for funding authorization is received from the second user at block 904.

An identifier of a first mobile device of a first user is accessed at block 906. The identifier of the first mobile device 108 may be associated with the payment account 116 of the first user.

The identifier of the second mobile device of the second user may be accessed at block 908. The identifier of the second mobile device 108 may be associated with the payment account 118 of the second user.

A single use authentication code relating to the identifier of the first mobile device is generated at block 910. The single use authentication code may be capable of being used to authenticate the second mobile device 108 of the second user at the POS device 110 and may enable a funds adjustment to the payment account 116 of the first user.

In an example embodiment, the single use authentication code may related to the identifier of the first mobile device 108 and the second mobile device 108 and may be capable of being used to authenticate the second mobile device 108 of the second user at the POS device 110 and enable a funds adjustment to the payment account 116 of the first user and/or or the second user.

The single use authentication code may be provided to the second mobile device 108 through the communications network 104 at block 912. Payment authorization may be processed for the payment account at block 914. For example, payment authorization may be processed according to the methods 600, 700, 800 (see FIGS. 6-8).

Figure 10:
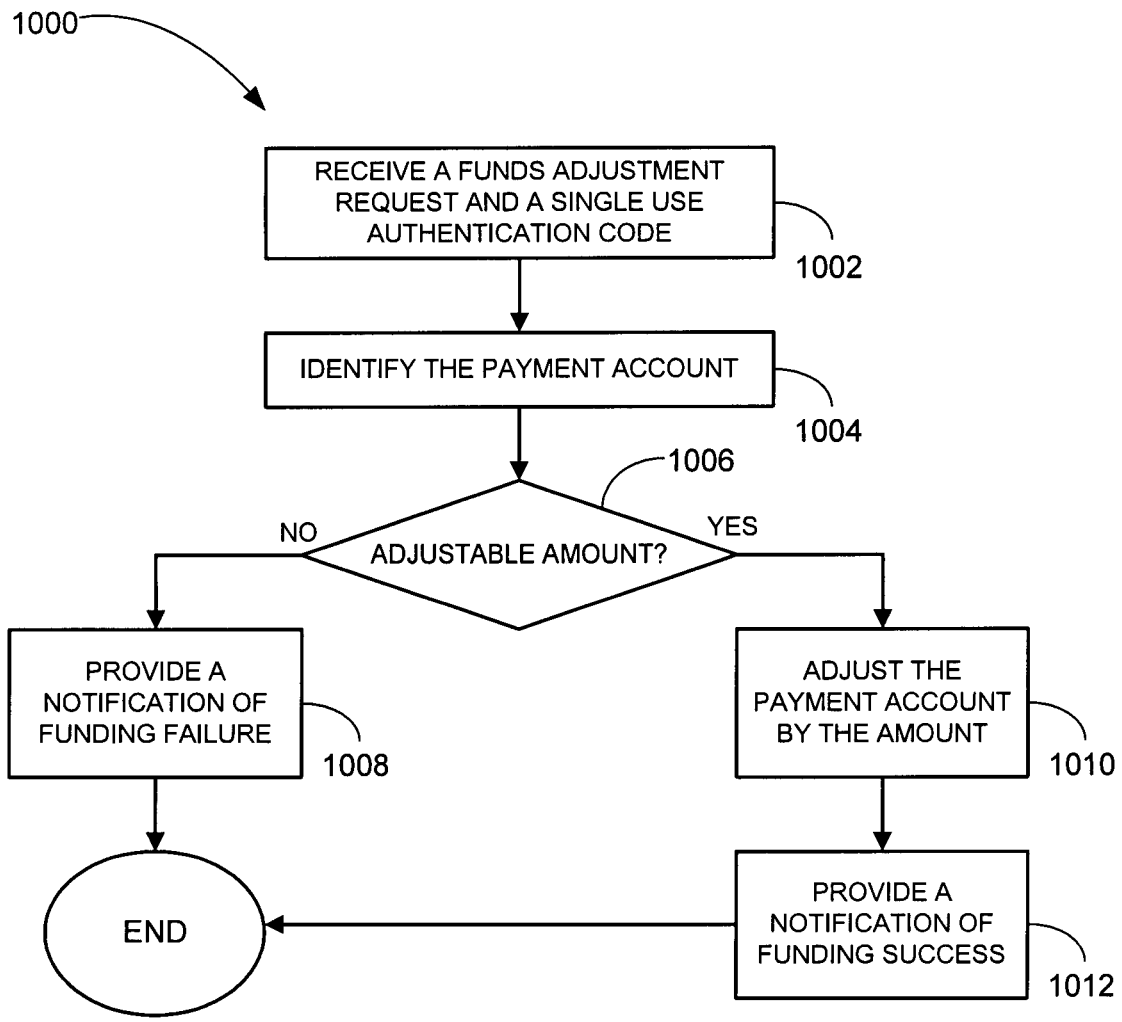
FIG. 10 is a flowchart illustrating a method for processing payment authorization according to an example embodiment.

FIG. 10 illustrates a method 1000 for processing payment authorization for the payment account 116 according to an example embodiment. The method 1000 may be performed at block 510 or block 912 (see FIGS. 5 and 9) by the authentication provider 106 or otherwise performed.

A funds adjustment request and a single use authentication code is received from the POS device 110 through the payment network 102 at block 1002. The payment account 116 is identified from the identifier related to the single use authentication code at block 1004.

A determination may be made at decision block 1006 as to whether the payment account 116 of the first user is adjustable by an amount indicated in the funds adjustment request. If the payment account of the first user is not adjustable by the amount, a notice of a failure of the funds adjustment request may be provided at block 1008. If the payment account of the first user is adjustable by the amount, the payment account of the first user may be adjusted by the amount at block 1010 and a notice of a success of the funds adjustment (e.g., the payment account has been adjusted by the amount) may be provided at block 1012.

In an example embodiment, the payment account 116 of the first user may be adjusted by a first portion of the amount and the payment account 116 of the second user may be adjusted by a second portion of the amount. For example, the first portion may be a sum of money designated by the first user and the second portion may be a remaining portion of the amount not designated by the first user.

Figure 11:
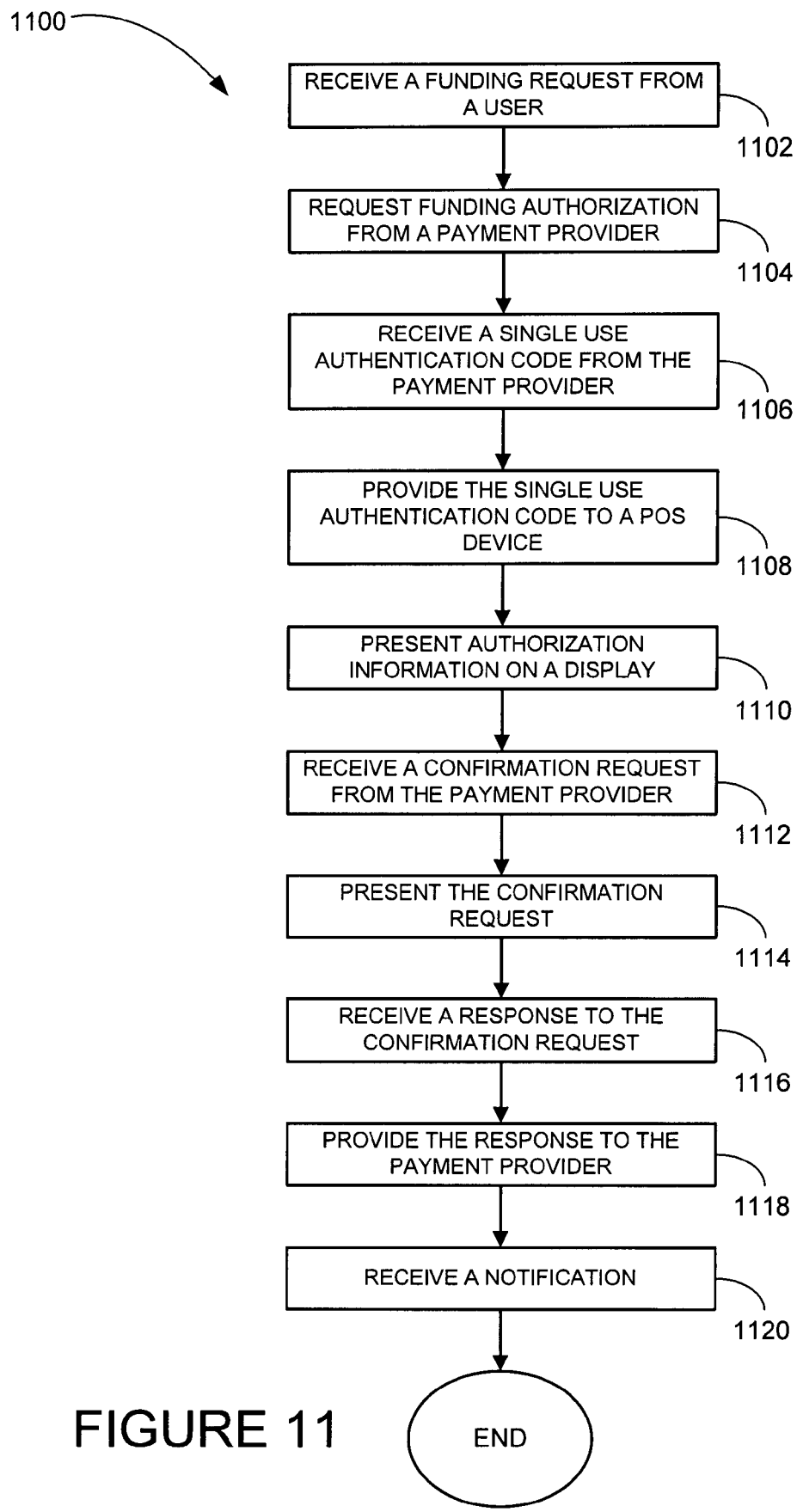
FIG. 11 is a flowchart illustrating a method for utilizing a mobile device according to an example embodiment.

FIG. 11 illustrates a method 1100 for utilizing the mobile device 108 according to an example embodiment. A funding request may be received from a user of the mobile device 108 at block 1102. At block 1104, funding authorization is requested from the authentication provider 106 through the mobile device 108.

A single use authentication code and an optional access code is received from the authentication provider 106 at block 1106. The single use authentication code may be capable of being used to authenticate the mobile device 108 at the POS device 110 and enable a funds adjustment to the payment account 116. The access code may be capable of being used with a terminal of the POS device 110 to authorize the funds adjustment.

The single use authentication code and an optional authorization routing number is provided through the mobile device 108 to the POS device 110 at block 1108. The single use authentication code and an optional authorization routing number may be provided simultaneously or sequentially. The authorization routing number may be capable of being used to identify the authentication provider 106 (e.g., as a provider of the payment account 116).

In an example embodiment, the single use authentication code and the authorization routing number may be a virtual debit card number and the access code may be a pin number. The single use authentication code and the authorization routing number may be a credit debit card number and the access code is a card identification number or credit card security code. Other embodiments of the single use authentication code, the authorization routing number, and/or the access code may also be used.

Authorization information may be presented on a display of the mobile device 108 at block 1110. For example, the presented authorization information may include the access code, the single use authentication code, and/or the authorization routing number. Other authorization information may also be presented.

In an example embodiment, a single use pattern may be generated from the single use authentication code and the authorization routing number and the single use pattern may be presented on the display of the mobile device 108. The single use pattern may be capable of being scanned by the POS device 110. The single use pattern may be a bar code or other type of cryptographic or non-cryptographic pattern.

A confirmation request may be received from the authentication provider 106 at block 1112.

The confirmation request may be presented on the mobile device 108 at block 1114. A response to the confirmation request may be received at block 1116. The response to the authentication provider 106 may be provided at block 1118. A notification may be received from the authentication provider 106 at block 1120.

Figure 12:
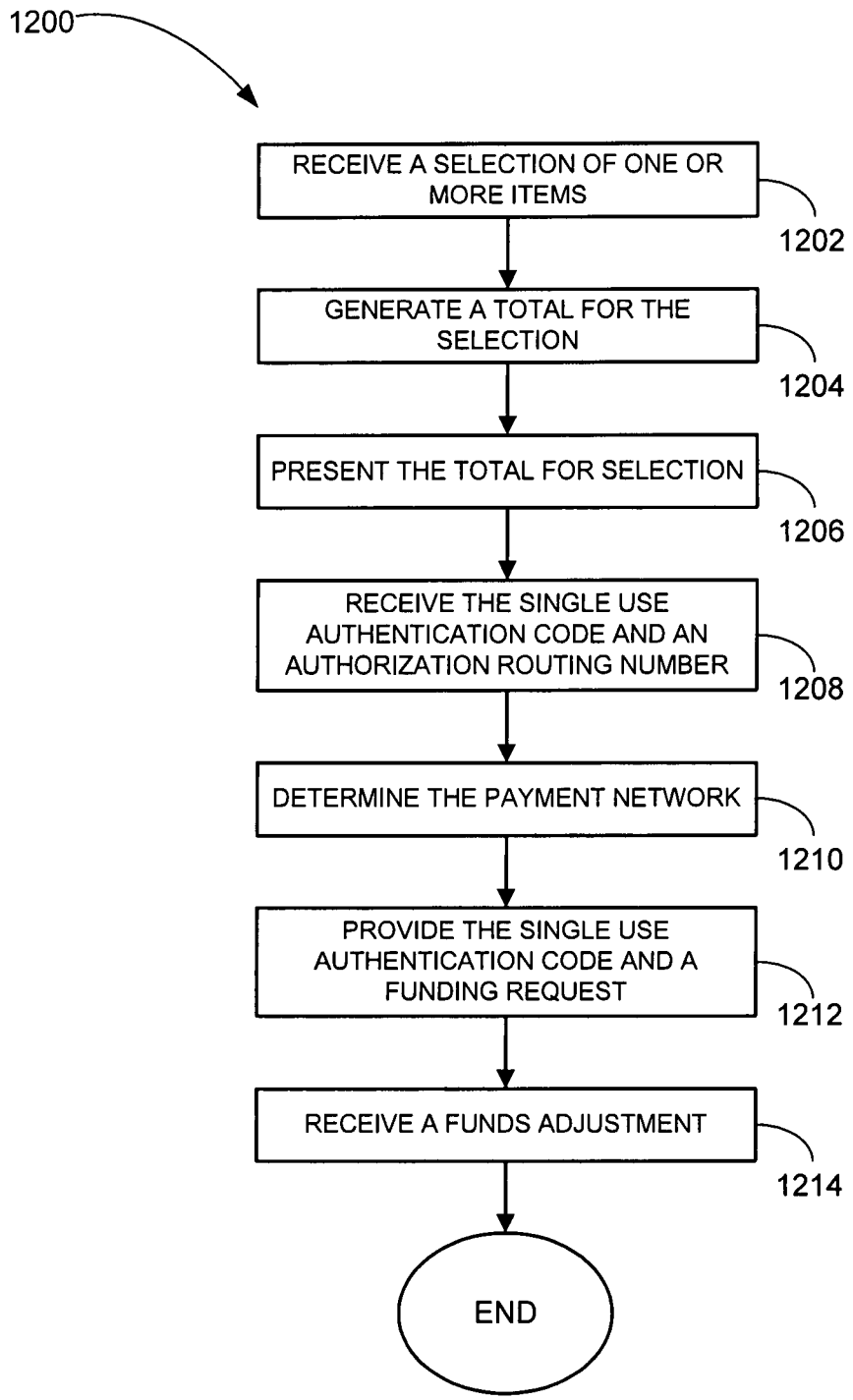
FIG. 12 is a flowchart illustrating a method for utilizing a point of sale device according to an example embodiment.

FIG. 12 illustrates a method 1200 for utilizing the POS device 110 according to an example embodiment. A selection of one or more items may be received at block 1202. A total for the selection may be generated at block 1204. The total for the selection may be presented on a display of a point of sale (POS) device at block 1206.

At block 1208, a single use authentication code and an optional authorization routing number is received from the mobile device 108. The single use authentication code and an optional authorization routing number may be received simultaneously or sequentially. The authorization routing number may be capable of being used to identify a provider of the payment account 116. The receipt of the single use authentication code and the optional authorization routing number may enable authorization of a funds adjustment to be made.

In an example embodiment, a display of the mobile device 108 may be scanned to receive the single use authentication code and an authorization routing number. The single use authentication code and an authorization routing number may be in the form of a single use pattern presented on the display of the mobile device 108. The single use authentication code and an authorization routing number may be provided from the mobile device 108 wirelessly (e.g., IR or RF), through a portable media card, or otherwise provided.

The payment network may be determined based on the authorization routing number at block 1210. The single use authentication code and a funding request is provided over the payment network 102 to the authentication provider 106 at block 1212. A funds adjustment related to the funding request is received from the authentication provider 106 at block 1214.

Figure 13:
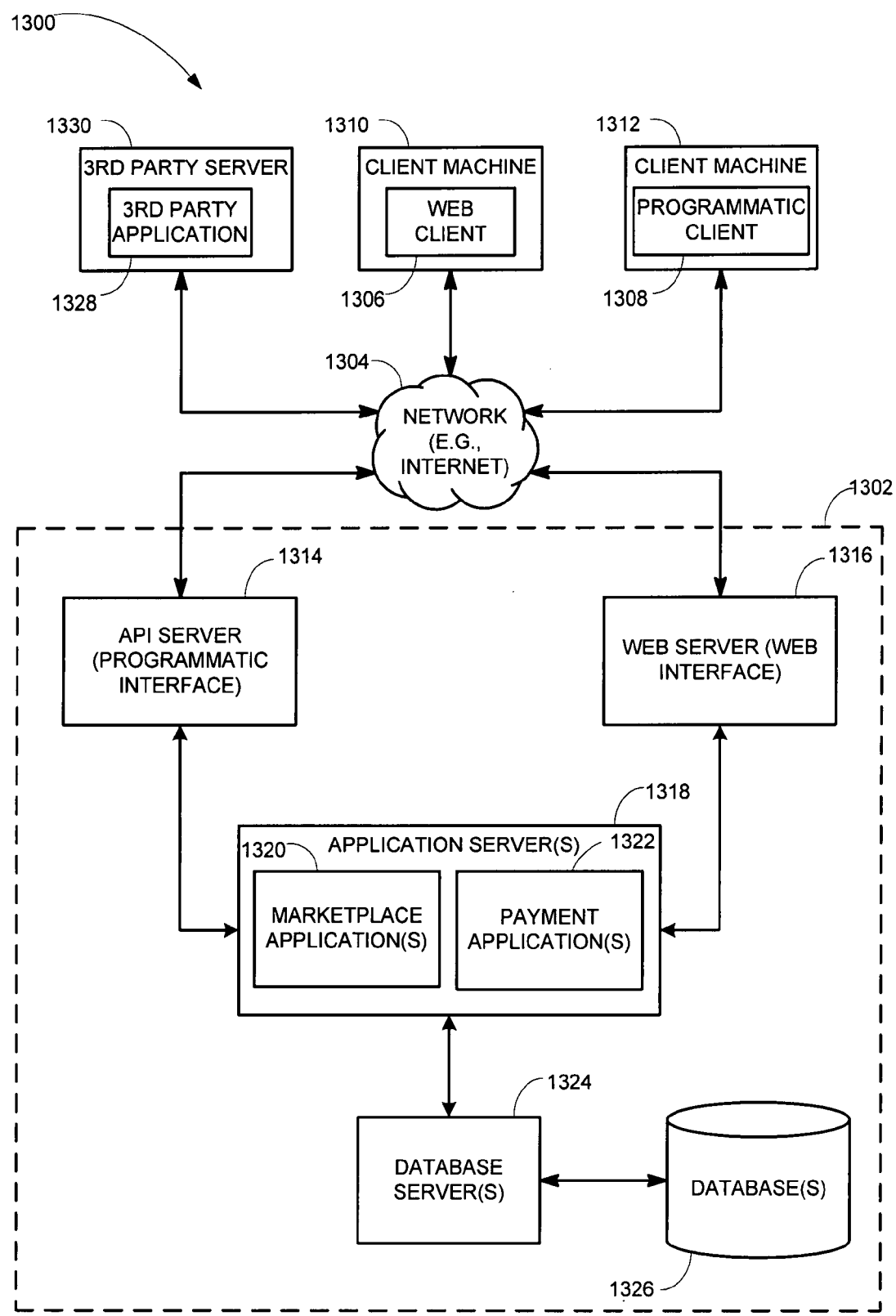
FIG. 13 is a network diagram depicting a network system, according to one embodiment, having a client server architecture configured for exchanging data over a network.

FIG. 13 is a network diagram depicting a client-server system 1300, within which one example embodiment may be deployed. By way of example, a network 1304 may include the functionality of the communications network 104, the authentication provider 106 may be deployed on the application server 1318 as a payment application 1322, a client machine 1310 or a client machine 1312 may include the functionality of the mobile device 108, and a database 1326 may include the functionality of the database 112. The system 100 may also be deployed in other systems.

A networked system 1302, in the example forms of a network-based marketplace or publication system, provides server-side functionality, via a network 1304 (e.g., the Internet or Wide Area Network (WAN)) to one or more clients. FIG. 13 illustrates, for example, a web client 1306 (e.g., a browser, such as the Internet Explorer browser developed by Microsoft Corporation of Redmond, Wash. State), and a programmatic client 1308 executing on respective client machines 1310 and 1312.

An Application Program Interface (API) server 1314 and a web server 1316 are coupled to, and provide programmatic and web interfaces respectively to, one or more application servers 1318. The application servers 1318 host one or more marketplace applications 1320 and authentication providers 1322. The application servers 1318 are, in turn, shown to be coupled to one or more databases servers 1324 that facilitate access to one or more databases 1326.

The marketplace applications 1320 may provide a number of marketplace functions and services to users that access the networked system 1302. The authentication providers 1322 may likewise provide a number of payment services and functions to users. The authentication providers 1322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1320. While the marketplace and authentication providers 1320 and 1322 are shown in FIG. 13 to both form part of the networked system 1302, in alternative embodiments the authentication providers 1322 may form part of a payment service that is separate and distinct from the networked system 1302.

Further, while the system 1300 shown in FIG. 13 employs a client-server architecture, the present invention is of course not limited to such an architecture, and could equally well find application in a distributed, or peer-to-peer, architecture system, for example. The various marketplace and authentication providers 1320 and 1322 could also be implemented as standalone software programs, which need not have networking capabilities.

The web client 1306 accesses the various marketplace and authentication providers 1320 and 1322 via the web interface supported by the web server 1316. Similarly, the programmatic client 1308 accesses the various services and functions provided by the marketplace and authentication providers 1320 and 1322 via the programmatic interface provided by the API server 1314. The programmatic client 1308 may, for example, be a seller application (e.g., the TurboLister™ application developed by eBay Inc., of San Jose, Calif.) to enable sellers to author and manage listings on the networked system 1302 in an off-line manner, and to perform batch-mode communications between the programmatic client 1308 and the networked system 1302.

FIG. 13 also illustrates a third party application 1328, executing on a third party server machine 1330, as having programmatic access to the networked system 1302 via the programmatic interface provided by the API server 1314. For example, the third party application 1328 may, utilizing information retrieved from the networked system 1302, support one or more features or functions on a website hosted by the third party. The third party may, for example, provide one or more promotional, marketplace or payment functions that are supported by the relevant applications of the networked system 1302.

Figure 14:
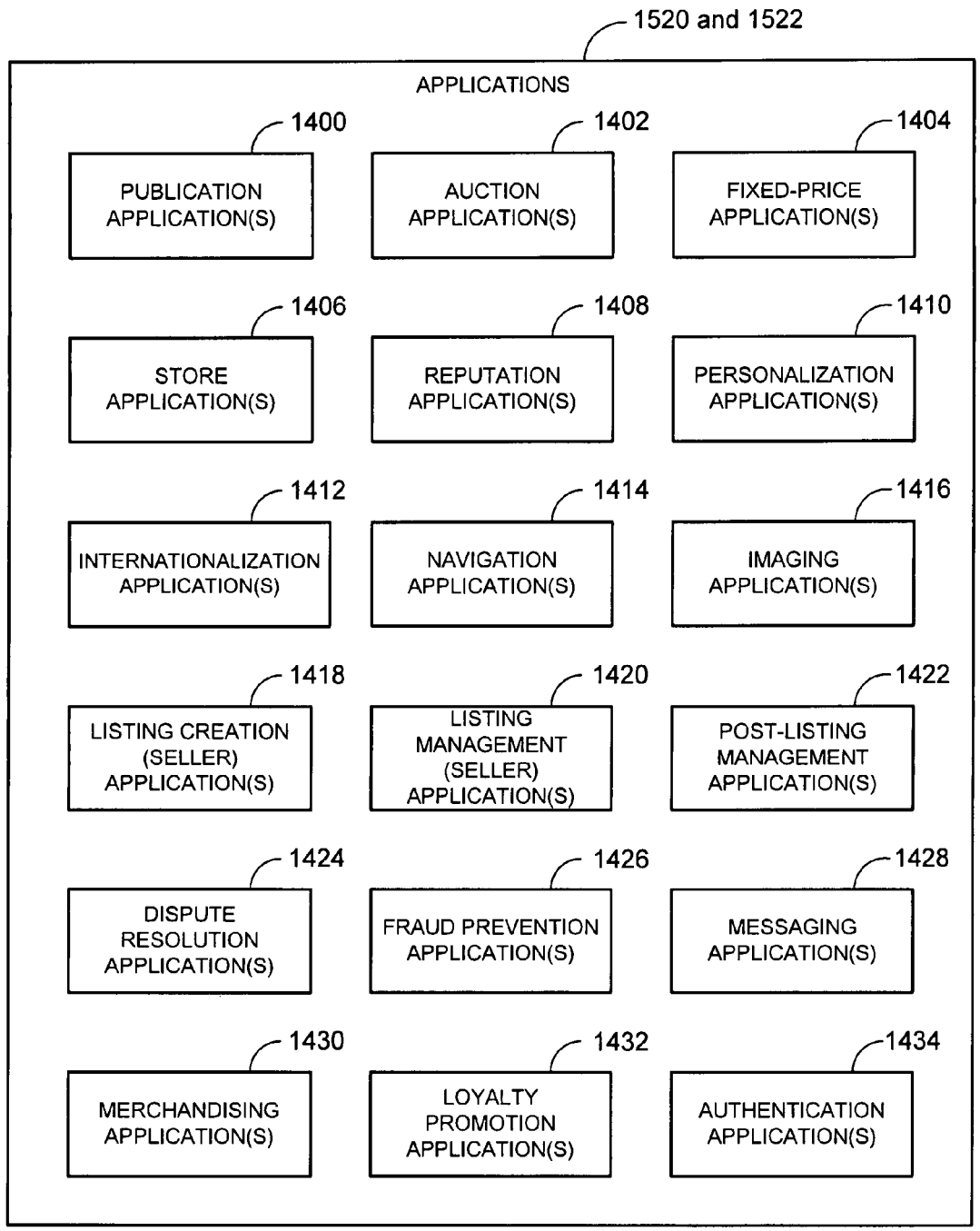
FIG. 14 is a block diagram illustrating an example embodiment of multiple network and marketplace applications, which are provided as part of the network-based marketplace.

FIG. 14 is a block diagram illustrating multiple applications 1320 and 1322 that, in one example embodiment, are provided as part of the networked system 1302 (see FIG. 13). The applications 1320 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1326 via the database servers 1324.

The networked system 1302 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1320 are shown to include at least one publication application 1400 and one or more auction applications 1402 which support auction-format listing and price setting mechanisms (e.g., English, Dutch, Vickrey, Chinese, Double, Reverse auctions etc.). The various auction applications 1402 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1404 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1406 allow a seller to group listings within a "virtual" store, which may be branded and otherwise personalized by and for the seller. Such a virtual store may also offer promotions, incentives and features that are specific and personalized to a relevant seller.

Reputation applications 1408 allow users that transact, utilizing the networked system 1302, to establish, build and maintain reputations, which may be made available and published to potential trading partners. Consider that where, for example, the networked system 1302 supports person-to-person trading, users may otherwise have no history or other reference information whereby the trustworthiness and credibility of potential trading partners may be assessed. The reputation applications 1408 allow a user, for example through feedback provided by other transaction partners, to establish a reputation within the networked system 1302 over time. Other potential trading partners may then reference such a reputation for the purposes of assessing credibility and trustworthiness.

Personalization applications 1410 allow users of the networked system 1302 to personalize various aspects of their interactions with the networked system 1302. For example a user may, utilizing an appropriate personalization application 1410, create a personalized reference page at which information regarding transactions to which the user is (or has been) a party may be viewed. Further, a personalization application 1410 may enable a user to personalize listings and other aspects of their interactions with the networked system 1302 and other parties.

The networked system 1302 may support a number of marketplaces that are customized, for example, for specific geographic regions. A version of the networked system 1302 may be customized for the United Kingdom, whereas another version of the networked system 1302 may be customized for the United States. Each of these versions may operate as an independent marketplace, or may be customized (or internationalized and/or localized) presentations of a common underlying marketplace. The networked system 1302 may accordingly include a number of internationalization applications 1412 that customize information (and/or the presentation of information) by the networked system 1302 according to predetermined criteria (e.g., geographic, demographic or marketplace criteria). For example, the internationalization applications 1412 may be used to support the customization of information for a number of regional websites that are operated by the networked system 1302 and that are accessible via respective web servers 1316.

Navigation of the networked system 1302 may be facilitated by one or more navigation applications 1414. For example, a search application (as an example of a navigation application) may enable key word searches of listings published via the networked system 1302. A browse application may allow users to browse various category, catalogue, or system inventory structures according to which listings may be classified within the networked system 1302. Various other navigation applications may be provided to supplement the search and browsing applications.

In order to make listings available via the networked system 1302 as visually informing and attractive as possible, the marketplace applications 1320 may include one or more imaging applications 1416 utilizing which users may upload images for inclusion within listings. An imaging application 1416 also operates to incorporate images within viewed listings. The imaging applications 1416 may also support one or more promotional features, such as image galleries that are presented to potential buyers. For example, sellers may pay an additional fee to have an image included within a gallery of images for promoted items.

Listing creation applications 1418 allow sellers conveniently to author listings pertaining to goods or services that they wish to transact via the networked system 1302, and listing management applications 1420 allow sellers to manage such listings. Specifically, where a particular seller has authored and/or published a large number of listings, the management of such listings may present a challenge. The listing management applications 1420 provide a number of features (e.g., auto-relisting, inventory level monitors, etc.) to assist the seller in managing such listings. One or more post-listing management applications 1422 also assist sellers with a number of activities that typically occur post-listing. For example, upon completion of an auction facilitated by one or more auction applications 1402, a seller may wish to leave feedback regarding a particular buyer. To this end, a post-listing management application 1422 may provide an interface to one or more reputation applications 1408, so as to allow the seller conveniently to provide feedback regarding multiple buyers to the reputation applications 1408.

Dispute resolution applications 1424 provide mechanisms whereby disputes arising between transacting parties may be resolved. For example, the dispute resolution applications 1424 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1426 implement fraud detection and prevention mechanisms to reduce the occurrence of fraud within the networked system 1302.

Messaging applications 1428 are responsible for the generation and delivery of messages to users of the networked system 1302, such messages for example advising users regarding the status of listings at the networked system 1302 (e.g., providing "outbid" notices to bidders during an auction process or to provide promotional and merchandising information to users). Respective messaging applications 1428 may utilize any one have a number of message delivery networks and platforms to deliver messages to users. For example, messaging applications 1428 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1430 support various merchandising functions that are made available to sellers to enable sellers to increase sales via the networked system 1302. The merchandising applications 1430 also operate the various merchandising features that may be invoked by sellers, and may monitor and track the success of merchandising strategies employed by sellers.

The networked system 1302 itself, or one or more parties that transact via the networked system 1302, may operate loyalty programs that are supported by one or more loyalty/promotions applications 1432. For example, a buyer may earn loyalty or promotions points for each transaction established and/or concluded with a particular seller, and may be offered a reward for which accumulated loyalty points can be redeemed.

Figure 15:
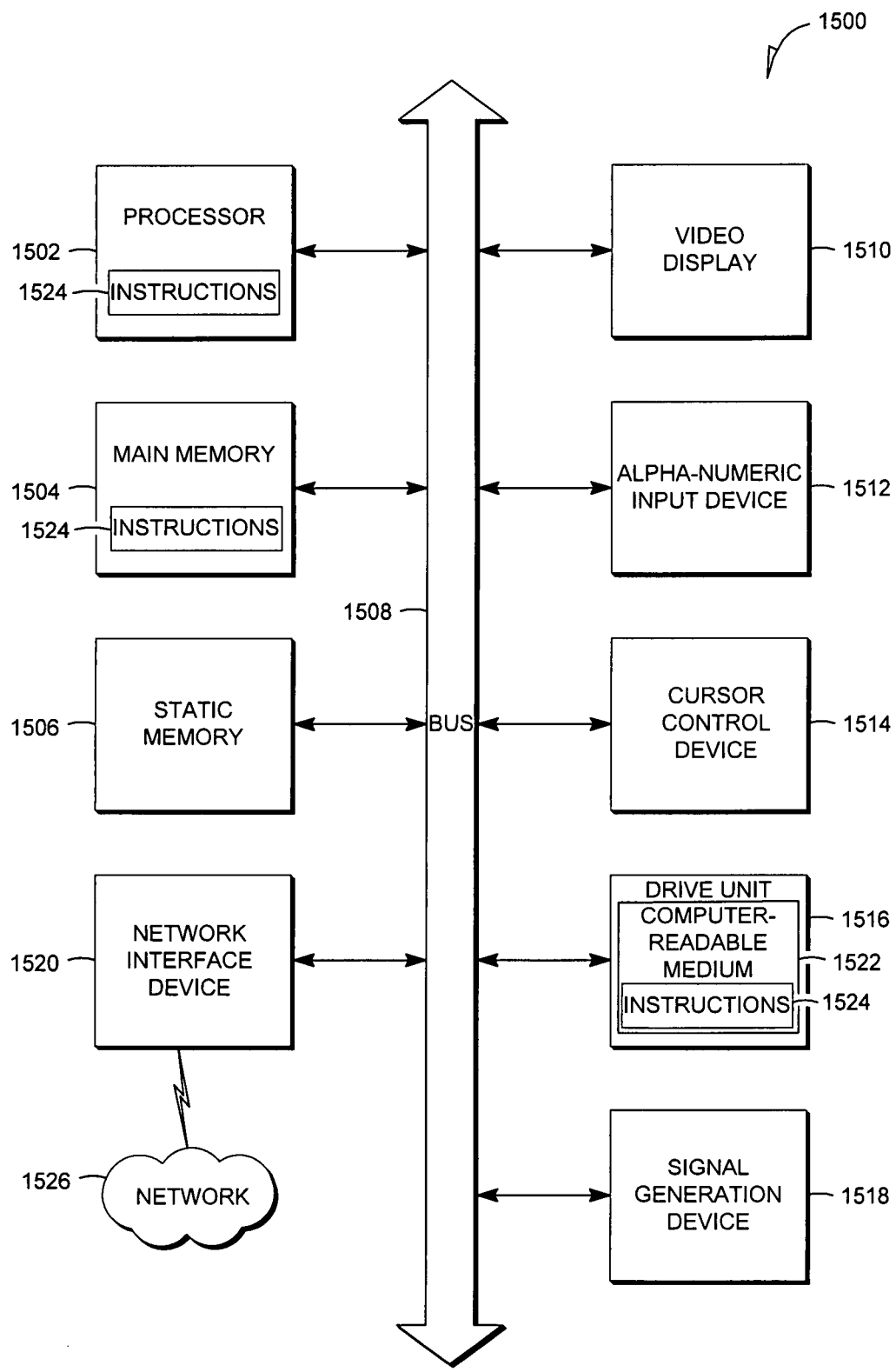
FIG. 15 is a block diagram diagrammatic representation of machine in the example form of a computer system within which a set of instructions for causing the machine to perform any one or more of the methodologies discussed herein may be executed.

FIG. 15 shows a diagrammatic representation of machine in the example form of a computer system 1500 within which a set of instructions may be executed causing the machine to perform any one or more of the methods, processes, operations, or methodologies discussed herein. The authentication provider 106 may operate on or more computer systems 1500 and/or the authentication provider 106, the mobile device 108, and/or the POS device 110 may include the functionality of the computer system 1500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a drive unit 1516, a signal generation device 1518 (e.g., a speaker) and a network interface device 1520.

The drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for dynamic funding have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing an identifier of a mobile device, the identifier enabling a payment account to be linked to the mobile device;
    generating, using one or more processors, a single use authentication code related to the accessed identifier, the single use authentication code to authenticate the mobile device at a point of sale (POS) device, to identify the payment account, and to enable a funds adjustment to the payment account; and
    providing the single use authentication code and an access code to the mobile device through a communications network, the access code authorizing the funds adjustment upon presentation to a terminal of the POS device.

2. The method of claim 1, wherein the accessing comprises:
    receiving a request for funding authorization from the mobile device; and
    accessing the identifier of the mobile device.

3. The method of claim 1, wherein the accessing comprises:
    associating the payment account with the identifier of the mobile device.

4. The method of claim 3, wherein the associating comprises:
    sending an identifier request for the identifier to a mobile device provider; and
    receiving the identifier of the mobile device from the mobile device provider.

5. The method of claim 3, wherein the associating comprises:
    sending an identifier request for the identifier to the mobile device; and
    receiving the identifier of the mobile device from the mobile device.

6. The method of claim 3, wherein the associating further comprises:
    sending a communication request message to the mobile device, the communication request message including request for a confirmation code; and
    receiving the confirmation code from the mobile device.

7. The method of claim 1, wherein the providing comprises:
    providing the single use authentication code and an access code to the mobile device through a communications network, the access code authorizing the funds adjustment upon presentation to a terminal of the POS device.

8. The method of claim 7, wherein the providing of the single use authentication code and the access code to the mobile device occurs at the same time.

9. The method of claim 1, further comprising:
    processing payment authorization for the payment account.

10. The method of claim 9, wherein the processing comprises:
    receiving a funds adjustment request and the single use authentication code from the POS device through an payment network;
    identifying the payment account associated with the identifier related to the single use authentication code;
    determining availability of funds in the payment account for an amount indicated in the funds adjustment request; and
    based on the determination, withdrawing funds in the amount from the payment account.

11. The method of claim 10, further comprising:
    providing a notification that the funds in the amount have been withdrawn from the payment account.

12. The method of claim 10, further comprising:
    providing a notification identifying a merchant that has been provided the amount of the funds.

13. The method of claim 10, further comprising:
    providing a notification identifying one or more items that have been purchased with the amount of the funds.

14. The method of claim 9, wherein the processing comprises:
    receiving a funds adjustment request and the single use authentication code from the POS device through an payment network;
    identifying the payment account associated with the identifier related to the single use authentication code;
    evaluating the funds adjustment request against an evaluation criterion; and
    based on the evaluation, adjusting the payment account by the amount.

15. The method of claim 14, wherein the evaluation criterion comprises at least one criterion selected from the group consisting of:
    a limit on a period of time since a pin code was entered into the mobile device,
    a calling pattern made with the mobile device,
    a transaction pattern made with the payment account,
    a period of time between providing the single use authentication code to the mobile device and receiving the single use authentication code back from the POS device,
    a specified sum of money,
    a specified type of item,
    a specified merchant, and
    a combination thereof.

16. The method of claim 9, wherein the processing comprises:
    receiving a funds adjustment request and the single use authentication code from the POS device through a payment network;
    identifying the payment account associated with the identifier related to the single use authentication code;
    evaluating the funds adjustment request against an evaluation criterion; and
    based on the evaluation, providing a confirmation request to the mobile device;
    receiving a response to the confirmation request; and
    based on the response, adjusting the payment account by the amount.

17. The method of claim 16, wherein the confirmation request comprises at least one of:
    a request for a pin code to be received by the mobile device,
    a request for an audible confirmation to be received by the mobile device, or a request for a log in to an authentication provider associated with the payment account.

18. The method of claim 9, wherein the processing comprises:
receiving a funds adjustment request and the single use authentication code from the POS device through an payment network;
identifying the payment account associated with the identifier related to the single use authentication code;
determining whether a first user associated with the payment account has authorized adjustment by an amount indicated in the funds adjustment request for a second user associated with the mobile device; and
based on the determination, adjusting the payment account by the amount.

19. The method of claim 1, wherein the single use authentication code includes a single use universal product code (UPC), a single use debit card number, a single use credit card number, or a single use account reference number.

20. The method of claim 1, wherein the identifier is stored on a Subscriber Identity Module (SIM) card of the mobile device or a Removable User Identity Module (RUIM) of the mobile device.

21. The method of claim 1, wherein the identifier is a unique identifier.

22. A method comprising:
requesting, using one or more processors, funding authorization from an authentication provider through a mobile device;
receiving a single use authentication code from the authentication provider, the single use authentication code being generated based on an accessed identifier of the mobile device and being used to authenticate the mobile device at a point of sale (POS) device, to identify a payment account linked to the mobile device by an identifier of the mobile device, and to enable a funds adjustment to the payment account; and
providing, through the mobile device, the single use authentication code and an access code, the access code authorizing the funds adjustment upon presentation to a terminal of the POS device.

23. The method of claim 22, wherein the requesting comprises:
receiving a funding request from a user of the mobile device; and
requesting funding authorization from the authentication provider through the mobile device.

24. The method of claim 22, wherein the receiving the single use authentication code comprises:
receiving the single use authentication code and an access code from the authentication provider, the access code authorizing the funds adjustment upon presentation to a terminal of the POS device.

25. The method of claim 24, wherein the providing comprises:
providing, through the mobile device, the single use authentication code and an authorization routing number to a POS device, the authorization routing number capable of being used to identify an authentication provider.

26. The method of claim 25, wherein the single use authentication code and an authorization routing number is a virtual debit card number and the access code is a pin number.

27. The method of claim 22, wherein the providing comprises:
providing, through the mobile device, the single use authentication code and an authorization routing number, the authorization routing number being used to identify a provider of the payment account.

28. The method of claim 27, wherein the providing comprises:
presenting the single use authentication code and the authorization routing number on a display of the mobile device.

29. The method of claim 27, wherein the presenting comprises:
generating a single use pattern from the single use authentication code and the authorization routing number; and
presenting the single use pattern on the display of the mobile device, the single use pattern capable of being scanned by a point of sale device.

30. The method of claim 29, wherein the single use pattern is a single use bar code.

31. The method of claim 22, further comprising:
receiving, at the mobile device, a notification from the authentication provider.

32. The method of claim 22, further comprising:
receiving a confirmation request from an authentication provider;
presenting the confirmation request on the mobile device;
receiving a response to the confirmation request; and
providing the response to the authentication provider.

33. A method comprising:
receiving a single use authentication code and an access code from a mobile device, the single use authentication code being generated based on an accessed identifier of the mobile device and being used to identify a payment account linked to the mobile device by an identifier of the mobile device, the access code authorizing a funds adjustment upon presentation to a terminal of a point of sale (POS) device;
providing, using one or more processors, the single use authentication code and a funding request over a payment network to an authentication provider; and
receiving the funds adjustment related to the funding request from the authentication provider.

34. The method of claim 33, wherein the receiving of the single use authentication code comprises:
receiving the single use authentication code and an authorization routing number from a mobile device, the authorization routing number capable of being used to identify a provider of the payment account; and
determining the payment network based on the authorization routing number.

35. The method of claim 34, wherein the receiving of the single use authentication code comprises:
scanning a display of the mobile device to receive the single use authentication code and an authorization routing number, the single use authentication code and an authorization routing number being in the form of a single use pattern presented on the display.

36. The method of claim 33, wherein the receiving of the single use authentication code comprises:
receiving a selection of one or more items;
generating a total for the selection;
presenting the total for the selection on a display of a point of sale (POS) device; and
receiving a single use authentication code from a mobile device.

37. A non-transitory machine-readable medium storing instructions, which when implemented by one or more processors of a machine, cause the machine to perform operations comprising:
accessing an identifier of a mobile device, the identifier enabling a payment account to be linked to the mobile device;

generating a single use authentication code related to the accessed identifier, the single use authentication code capable of being used to authenticate the mobile device at a point of sale (POS) device, to identify the payment account, and to enable a funds adjustment to the payment account; and providing the single use authentication code and an access code to the mobile device through a communications network, the access code authorizing the funds adjustment upon presentation to a terminal of the POS device.

38. The non-transitory machine-readable medium of claim 37 wherein the operations further comprise:

receiving a funds adjustment request and the single use authentication code from the POS device through an payment network;

identifying the payment account associated with the identifier related to the single use authentication code;

determining availability of funds in the payment account for an amount indicated in the funds adjustment request; and based on the determination, withdrawing funds in the amount from the payment account.

39. The non-transitory machine-readable medium of claim 37 wherein operations further comprise:

receiving a funds adjustment request and the single use authentication code from the POS device through an payment network;

identifying the payment account associated with the identifier related to the single use authentication code;

evaluating the funds adjustment request against an evaluation criterion; and based on the evaluation, adjusting the payment account by the amount.

40. The non-transitory machine-readable medium of claim 37 wherein the operations further comprise:

receiving a adjustment request and the single use authentication code from the POS device through an payment network;

identifying the payment account associated with the identifier related to the single use authentication code;

evaluating the funds adjustment request against an evaluation criterion; and based on the evaluation, providing a confirmation request to the mobile device;

receive a response to the confirmation request; and based on the response, adjusting the payment account by the amount.

41. The non-transitory machine-readable medium of claim 37 wherein operations further comprise:

receiving a funds adjustment request and the single use authentication code from the POS device through an payment network;

identifying the payment account associated with the identifier related to the single use authentication code;

determining whether a first user associated with the payment account has authorized adjustment by an amount indicated in the funds adjustment request for a second user associated with the mobile device; and based on the determination, adjusting the payment account by the amount.

42. A non-transitory machine-readable medium storing instructions, which when implemented by one or more processors of a machine, cause the machine to perform operations comprising:

requesting funding authorization from an authentication provider through a mobile device;

receiving a single use authentication code from the authentication provider, the single use authentication code being used to authenticate the mobile device at a point of sale (POS) device, to identify the payment account linked to the mobile device by an identifier of the mobile device, and to enable a funds adjustment to the payment account; and providing, through the mobile device, the single use authentication code and an access code, the access code authorizing the funds adjustment upon presentation to a terminal of the POS device.

43. The non-transitory machine-readable medium of claim 42 wherein the operations further comprise:

receiving a confirmation request from an authentication provider;

presenting the confirmation request on the mobile device;

receiving a response to the confirmation request; and providing the response to the authentication provider.

* * * * *

UNITED STATES PATENT AND TRADEMARK OFFICE
CERTIFICATE OF CORRECTION

| | | |
|---|---|---|
| PATENT NO. | : 8,538,819 B2 | Page 1 of 1 |
| APPLICATION NO. | : 11/881920 | |
| DATED | : September 17, 2013 | |
| INVENTOR(S) | : Timothy M. Murphy | |

It is certified that error appears in the above-identified patent and that said Letters Patent is hereby corrected as shown below:

In the Claims

In column 18, line 33, in Claim 33, delete "adiustment" and insert --adjustment--, therefor Signed and Sealed this
Second Day of December, 2014

Michelle K. Lee
*Deputy Director of the United States Patent and Trademark Office*